United States Patent [19]

Gleason et al.

[11] Patent Number: 5,153,307

[45] Date of Patent: Oct. 6, 1992

[54] STABILIZATION OF POLYAMIDE ALKYL ESTER SOLUTIONS

[75] Inventors: Robert T. Gleason, Burlington; Harold G. Linde, Richmond, both of Vt.

[73] Assignee: International Business Machines Corporation, Armonk, N.Y.

[21] Appl. No.: 738,656

[22] Filed: Jul. 31, 1991

[51] Int. Cl.$^5$ ............................................. C08F 6/02
[52] U.S. Cl. ................................................. 528/486
[58] Field of Search ............... 524/321, 286; 528/486, 528/490, 491

[56] References Cited

U.S. PATENT DOCUMENTS

| | | | |
|---|---|---|---|
| 2,806,856 | 9/1957 | Robinson | 260/326.5 |
| 3,140,294 | 7/1964 | Kolyer | 260/326.5 |
| 3,184,476 | 5/1965 | Wingfield et al. | 260/326.5 |
| 3,393,170 | 7/1968 | Koblitz et al. | 260/30.2 |
| 3,541,036 | 11/1970 | Libackyj et al. | 524/296 |
| 4,264,501 | 4/1981 | Bour et al. | 260/326.5 |
| 4,384,125 | 5/1983 | Goettsch et al. | 548/555 |
| 4,467,000 | 8/1984 | Economy et al. | 427/385.5 |
| 4,612,210 | 9/1986 | Hofer et al. | 427/82 |
| 4,647,661 | 3/1987 | Senni et al. | 540/537 |
| 4,757,098 | 7/1988 | Merrem et al. | 522/75 |

Primary Examiner—Paul R. Michl
Assistant Examiner—Tae H. Yoon
Attorney, Agent, or Firm—William D. Sabo

[57] ABSTRACT

Solutions of polyamide alkyl esters are stabilized by incorporation of a select acidic compound, which inhibits premature imidization of the ester.

18 Claims, No Drawings

STABILIZATION OF POLYAMIDE ALKYL ESTER SOLUTIONS

BACKGROUND OF THE INVENTION

1. Technical Field

This invention relates to a method of stabilizing the viscosity of a solution of a polyamide alkyl ester solution. The invention also relates to compositions whose viscosity has been stabilized that are comprised of a polyamide alkyl ester.

2. Description of the Prior Art

Polyimide coatings are known in the art, as shown, for example, in U.S. Pat. No. 4,467,000, issued to Economy, et al. on Aug. 21, 1984. Polyimide materials have been recently investigated by the semiconductor industry for use as insulators in multilevel interconnection systems. Polyimide insulating coatings having particularly desirable planarization characteristics have been prepared from polyamide alkyl esters formed from a pyromellitic alkyl diester and a para-linked aromatic diamine, as disclosed in U.S. Pat. No. 4,612,210, issued to Hofer, et al. on Sep. 16, 1986.

Use of solutions containing a polyamide alkyl ester presents a problem, however, in that these solutions may gel prematurely, leading to a reduced shelf life of only a few weeks and to formation of non-uniform coatings. There is a need in the art, therefore, for a method for stabilizing over time the viscosity of a solution of a polyamide alkyl ester.

The prior art does not, however, provide such a viscosity stabilization technique suitable for these purposes. Reference is made, for example, to U.S. Pat. No. 4,757,098, issued to Merrem, et al. on Jul. 12, 1988, which discloses a method of stabilizing a polyamide ester polymer precursor against non-photoinduced crosslinking, by adding to a solution of the precursor a chelate complex-former, such as EDTA.

SUMMARY OF THE INVENTION

Against this background, it has now been discovered, according to the invention, that gelation of such solutions occurs because of amine impurities that are in the solution. Presence of these amines may result from the synthesis of the ester; see, for example, U.S. Pat. No. 4,612,210, cited above, where N-methylmorpholine is used as an acid scavenger. Or, an alkyl amine, such as methyl amine, may be introduced as a residual impurity in the solvent employed, commonly, an amide-type solvent, e.g. N-methyl-2-pyrrolidone. It is now believed, according to the invention, that these amines serve to prematurely catalyze imidization of the ester precursor to the corresponding polyimide. The solution gels to form globular precipitates, producing the undesired results noted above, i.e. significantly reduced shelf life and the eventual formation of coatings with unsatisfactory characteristics, such as non-uniformity, dewetting from the substrate and so forth.

In order to overcome this, in accordance with the invention, an effective amount of an acidic compound is incorporated into the solution of the polyamide alkyl ester. A small amount, generally less than 0.1 percent by weight of the total solution, of a select acidic compound is employed to neutralize the amine impurities, but without adversely affecting the properties of the resulting polyimide product.

Typically, the solution of the polyamide alkyl ester, comprises as the solvent for the ester, a conventional amide-type solvent, such as N-methyl-2-pyrrolidone. It is noted that various techniques have been developed for treating pyrrolidone for purification purposes. For example, in U.S. Pat. No. 2,806,856, issued to Robinson on Sep. 17, 1957, pyrrolidone is heated to a temperature below the distillation temperature, and is treated first with a carboxylic acid anhydride and then with a nonvolatile, strong base, such as sodium or potassium hydroxide. And, in U.S. Pat. No. 3,140,294, issued to Kolyer on Jul. 7, 1964, pyrrolidone is treated first with concentrated sulfuric acid, then with activated carbon; the activated carbon is removed, and the treated pyrrolidone is distilled to remove additional impurities.

Amide-type solvents have also been stabilized against degradation and discoloration effects of heat and light, by incorporation of an acyl chloride or an acid anhydride. See U.S. Pat. No. 3,393,170, issued to Koblitz, et al. on Jul. 16, 1968.

None of these prior approaches, teaches a method for stabilizing the viscosity of a solution of a polyamide alkyl ester to inhibit premature imidization.

DETAILED DESCRIPTION

In accordance with the invention, any acidic compound which is effective in neutralizing the amine impurities in the solution may be employed. Generally, the acidic compound is an organic acid or its corresponding anhydride. Generally, it has been found that the acidic compound employed should have a pKa< about 3. Preferably, the acidic compound is a carboxylic or dicarboxylic acid or its corresponding anhydride having a pKa< about 3. A particularly preferred group of acidic compounds for use in accordance with the invention, includes o-phthalic acid, o-phthalic anhydride, citric acid, α-tartaric acid, oxalic acid and maleic anhydride.

The amount of acidic compound incorporated into the solution can vary widely, but it should be employed in an amount which is sufficient to react with substantially all the amine impurities present in the solution. Preferably, the acidic compound is used in excess of that necessary to neutralize all the amine impurities. Generally, the amount of acidic compound incorporated into the solution ranges from about 0.01 percent to about 0.1 percent by weight, based on the weight of the total solution.

Preferably, the polyamide alkyl ester is formed from a pyromellitic alkyl diester or a biphenylene dianhydride-derived alkyl diester and a para-linked aromatic diamine. Such diesters are commonly obtained by alcoholosis of pyromellitic dianhydride (PMDA) or biphenylene dianhydride (BPDA), preferred compounds including the dimethyl ester, the diethyl ester and the dipropyl ester. Examples of suitable para-linked aromatic diamines include p-phenylene diamine; 4,4'-diamino phenyl sulfone; 4,4'-diamino biphenyl; bis(4'-amino phenoxy)-1,4-benzene; 3,3',5,5'-tetramethyl benzidine; and 4,4'-diamino octafluoro benzidine. A preferred embodiment of the invention employs poly(4,4'-phenoxyphenylene pyromellitamide ethyl diester) (PMDA-ODA ethyl diester). A particularly suitable method for preparing such polyimide alkyl esters is disclosed in U.S. Pat. No. 4,612,210, the entire disclosure of which is incorporated herein by reference.

Examples of suitable solvents are amide-type solvents including amides, lactams and ureas, such as N,N-dimethyl-formamide; N,N-dimethylacetamide; N-methyl-2-pyrrolidone; N-cyclohexyl-2-pyrrolidone; N,N-diethylacetamide;

N,N-diethyl-formamide;
N,N-dimethyl-γ-hydroxybutyramide;
N,N-dimethylmethoxyacetamide; N,N-dibutylformamide;
N-methylpropionamide; 2-piperidone;
N-methyl-2-piperidone; N-ethyl-2-pyrrolidone;
N-isopropyl-2-pyrrolidone; 5-methyl-2-pyrrolidone; and tetramethylurea.

Other suitable solvents include lactones, such as γ-butyrolactone, furfural alcohol and dimethylsulfoxide (DMSO). A preferred embodiment of the invention employs N-methyl-2-pyrrolidone. The amount of solvent employed can vary over wide limits, but in most situations varies from about 75 to about 95 percent, and preferably from about 80 to about 90 percent, of total solution.

In carrying out the method of the invention, an effective amount of the acidic compound is incorporated into a solution of the polyamide alkyl ester in a suitable solvent. This may include adding the acidic compound, after the polyamide alkyl ester has been dissolved in the solvent; or, preferably, adding the acidic compound to the solvent before it is mixed with the ester to form the solution. By first adding the acidic compound to the solvent, neutralization of any amine impurities in the solvent can take place prior to admixture with the ester.

Compositions of the invention, which include an acidic compound, exhibit a relatively stable viscosity over a period of time, thus satisfactorily achieving extended shelf life without gelling. Further, the acidic compound does not adversely affect the properties of the polyimide coating which is produced from the composition. No specific, additional storage conditions are required after incorporation of the acidic compound to achieve the stabilizing effect of the invention.

The following examples are provided to illustrate the invention.

EXAMPLES AND COMPARATIVE EXAMPLES

Solutions were prepared containing 17 percent by weight of a polyamide alkyl ester, poly (4,4'-phenoxyphenylene pyromellitamide ethyl diester), 74.7 percent by weight of N-methyl-2-pyrrolidone and 8.3 percent by weight of N-cyclohexyl-2-pyrrolidone. The solutions were then doped with 20 ppm of an amine, either N-methylmorpholine (NMM) or n-butylamine (NBA). Then, 100 ppm (0.01 percent by weight) of an acidic compound was added to the solution.

The viscosity of each solution was monitored using a size 400 Cannon-Fenske Routine Viscometer in a water bath held at 35° C., in accordance with standard techniques. (See ASTM D 445 and D 2515.) The results are summarized in TABLE I below. In general, stabilization occurred if the viscosity of the solution remained below about 500 centistokes (cs) over time.

TABLE I

Viscosity Behavior Of Solutions

| Example or Comparative Example No. | Acidic Compound | Amine | Viscosity (cs) - Days | | | | | | | | |
|---|---|---|---|---|---|---|---|---|---|---|---|
| | | | 0 | 1 | 2 | 3 | 4 | 5 | 6 | 7 | 8 |
| CE-1 | None | None | 445 | 447 | 447 | 448 | | | 454 | 456 | |
| CE-2 | None | NMM | 447 | 454 | 469 | 488 | | | 582 | 664 | |
| 1 | O-Phthalic Acid | NMM | 447 | 450 | | | 455 | 457 | | | |
| CE-3 | Octanoic Acid | NMM | 448 | 454 | | | 513 | 543 | | | |
| CE-4 | PMDA-ODA Amic Acid | NMM | 449 | 455 | 471 | 491 | | | 581 | | |
| CE-5 | Octanoic Acid | NMM | 449 | 456 | | | 511 | | 585 | | |
| CE-6 | Succinic Anhy. | NMM | 452 | 461 | | | 520 | | 595 | | |
| CE-7 | Succinamic Acid | NMM | 452 | 458 | | | 511 | | 585 | | |
| 2 | O-Phthalic Anhy. | NMM | 449 | 451 | | | 463 | | 473 | | |
| CE-8 | None | NMM | 449 | 456 | | | 521 | | 601 | | |
| CE-9 | None | NBA | 494 | 526 | | | 545 | 549 | | | 562 |
| CE-10 | None | None | 454 | 457 | | | 463 | 466 | | | 474 |
| CE-11 | Succinamic Acid | NBA | 487 | 490 | | | 507 | | | | |
| 3 | Succinic Anhy. | NBA | 472 | 476 | | | 483 | 485 | | | 489 |
| CE-12 | Succinic Acid | NBA | 487 | 493 | | | 506 | | | | |
| CE-13 | Octanoic Acid | NBA | 488 | 494 | | | 506 | | | | |
| CE-14 | Gallic Acid | NBA | 494 | 502 | | | 521 | 527 | | | |
| CE-15 | None | None | 467 | 470 | | | 478 | | | | |
| CE-16 | None | NMM | 466 | 482 | | | 589 | | | | |
| CE-17 | Succinamic Acid | NMM | 470 | 487 | | | 625 | | | | |
| CE-18 | Succinic Anhy. | NMM | 467 | 500 | | | 715 | | | | |
| CE-19 | Succinic Acid | NMM | 471 | | | | 581 | | | | |
| CE-20 | Octanoic Acid | NMM | 466 | | | | 586 | | | | |
| CE-21 | Gallic Acid | NMM | 472 | | | | 596 | | | | |
| CE-22 | None | None | 472 | 474 | | | 479 | | 483.5 | | |
| CE-23 | None | NMM | 475 | 490 | | | 650 | | GEL | | |
| 4 | Citric Acid | NMM | 478 | 478 | | | 490 | | 505.2 | | |
| 5 | α-Tartaric Acid | NMM | 474 | 477 | | | 506 | | 539.3 | | |
| 6 | Oxalic Acid | NMM | 470 | 470 | | | 472 | | 475.7 | | |
| 7 | Maleic Anhy. | NMM | 474 | 480 | | | 462 | | 470.8 | | |

*Note: Anhy. represents anhydride.

What is claimed is:

1. A method of stabilizing the viscosity of an organic solution of a polyamide alkyl ester, said solution containing amine impurities, which comprises incorporating into said solution an effective amount of an acidic compound to inhibit premature imidization of said ester, wherein said acidic compound is added in an amount which is sufficient to react with substantially all the amine impurities present in said solution.

2. The method of claim 1, wherein said acidic compound is an organic acid or its corresponding anhydride having a pKa < about 3.

3. The method of claim 2, wherein said acidic compound is a carboxylic or dicarboxylic acid or its corresponding anhydride having a pka< about 3.

4. The method of claim 3, wherein said acidic compound is selected from o-phthalic acid, o-phthalic anhydride, citric acid, α-tartaric acid, oxalic acid and maleic anhydride.

5. The method of claim 1, wherein said acidic compound is first added to a solvent before said solvent is mixed with said polyamide alkyl ester to form said solution.

6. The method of claim 1, wherein said polyamide alkyl ester is formed from a pyromellitic alkyl diester or a biphenylene dianhydride-derived alkyl diester and a para-linked aromatic diamine.

7. The method of claim 6, wherein said polyamide alkyl ester is poly(4,4'-phenoxyphenylene pyromellitamide ethyl diester).

8. The method of claim 1, wherein said solution comprises an amide-type solvent.

9. The method of claim 8, wherein said solvent is N-methyl-2-pyrrolidone.

10. A composition whose viscosity is stabilized, comprising a polyamide alkyl ester, an organic solvent, and an effective amount of an acidic compound to inhibit premature imidization of said ester, said effective amount of said acidic compound being sufficient to react with substantially all the amine impurities present in said ester and said solvent.

11. The composition of claim 10, wherein said acidic compound is an organic acid or its corresponding anhydride having a pKa< about 3.

12. The composition of claim 11, wherein said acidic compound is a carboxylic or dicarboxylic acid or its corresponding anhydride having a pKa< about 3.

13. The composition of claim 12, wherein said acidic compound is selected from o-phthalic acid, o-phthalic anhydride, citric acid, α-tartaric acid, oxalic acid and maleic anhydride.

14. The composition of claim 10, wherein said polyamide alkyl ester is formed from a pyromellitic alkyl diester or a biphenylene dianhydride-derived alkyl diester and a para-linked aromatic diamine 15. The composition of claim 14, wherein said polyamide alkyl ester is poly(4,4'-phenoxyphenylene pyromellitamide ethyl diester).

16. The composition of claim 10, wherein said solution comprises an amide-type solvent.

17. The composition of claim 16, wherein said solvent is N-methyl-2-pyrrolidone.

18. The composition of claim 10, wherein said polyamide alkyl ester is poly(4,4'-phenoxyphenylene pyromellitamide ethyl diester), said solvent is N-methyl-2-pyrrolidone and said acidic compound is selected from o-phthalic acid, o-phthalic anhydride, citric acid, α-tartaric acid, oxalic acid and maleic anhydride.

* * * * *